(12) United States Patent
Mbarek et al.

(10) Patent No.: US 9,083,228 B2
(45) Date of Patent: Jul. 14, 2015

(54) INTERCHANGEABLE STATOR WITH ASYMMETRIC POLE SHOE FOR ELECTROMAGNETIC RETARDER

(71) Applicant: TELMA, Saint Ouen l'Aumone (FR)

(72) Inventors: Akafou Mbarek, Les Mureaux (FR); Romuald Belance, Deuil la Barre (FR); Rafik Lounis, Cergy (FR); Nicolas Quennet, Cormeilles en Parisis (FR)

(73) Assignee: TELMA, Saint Ouen l'Aumone (FR)

( * ) Notice: Subject to any disclaimer, the term of this patent is extended or adjusted under 35 U.S.C. 154(b) by 101 days.

(21) Appl. No.: 13/652,842

(22) Filed: Oct. 16, 2012

(65) Prior Publication Data

US 2013/0093274 A1    Apr. 18, 2013

(30) Foreign Application Priority Data

Oct. 17, 2011    (FR) ...................................... 11 59349

(51) Int. Cl.
*H02K 49/00* (2006.01)
*H02K 49/02* (2006.01)
*H02K 49/04* (2006.01)

(52) U.S. Cl.
CPC .............. *H02K 49/04* (2013.01); *H02K 49/046* (2013.01)

(58) Field of Classification Search
CPC ...................................................... H02K 49/04
USPC ............................ 310/93, 103, 105, 106, 107
See application file for complete search history.

(56) References Cited

U.S. PATENT DOCUMENTS

| | | | | |
|---|---|---|---|---|
| 2,830,206 A | * | 4/1958 | Bessiere | ........................ 310/93 |
| 3,553,507 A | | 1/1971 | Bessiere | |
| 4,128,147 A | * | 12/1978 | Lafuente Ruberte | ......... 188/164 |
| 4,668,886 A | | 5/1987 | Marandet et al. | |

FOREIGN PATENT DOCUMENTS

| | | | | |
|---|---|---|---|---|
| FR | GB1147373 A | * | 4/1969 | |
| FR | 95 552 E | | 3/1971 | |
| FR | 2 574 228 A1 | | 6/1986 | |
| FR | 2 577 357 A | | 8/1986 | |
| FR | 2 853 157 A1 | | 10/2004 | |
| FR | 2853157 A1 | * | 10/2004 | |
| FR | 2 863 787 A1 | | 6/2005 | |
| GB | 2 171 852 A | | 9/1986 | |
| WO | WO 2005057764 A1 | * | 6/2005 | |

OTHER PUBLICATIONS

Machine Translation WO2005057764 (2005).*
French Search Report, dated Jun. 13, 2012, from corresponding French application.

* cited by examiner

*Primary Examiner* — Jose Gonzalez Quinone
(74) *Attorney, Agent, or Firm* — Young & Thompson

(57) ABSTRACT

A stator (1') for electromagnetic retarders intended for vehicle gearbox and axle installations, includes at least one electromagnetic coils (2) assembly, two identical annular radial flanges (5', 5"), and an asymmetrical pole shoe (6) on each radial transverse face of the two ends of each of the electromagnetic coils, and attached by a central axial screw (7), perforated attachment studs that are symmetrical relative to a median plane (M) between and parallel to the transverse faces, attached to the electromagnetic coil (2) support (5', 5") in order to attach the stator (1') beside one or the other of the transverse faces to a stator support of the vehicle, using fasteners.

20 Claims, 5 Drawing Sheets

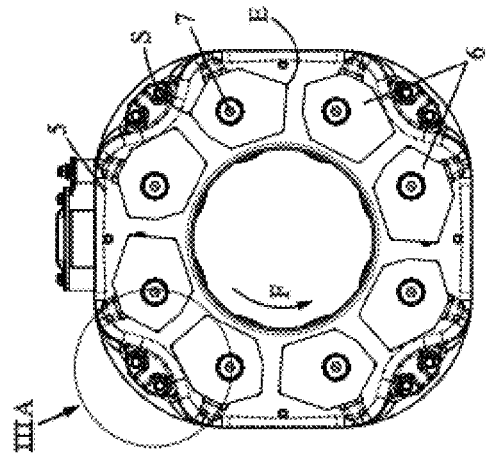
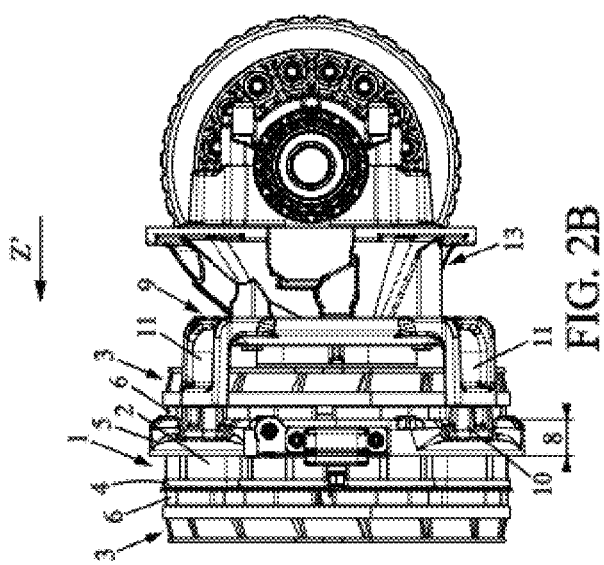
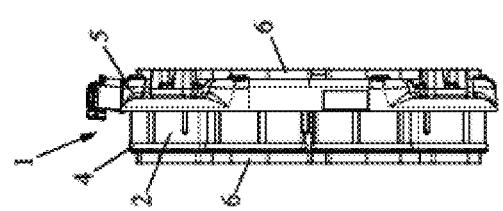

INTERCHANGEABLE STATOR WITH ASYMMETRIC POLE SHOE FOR ELECTROMAGNETIC RETARDER

BACKGROUND OF THE INVENTION

1. Field of the Invention

The invention relates to an induction stator for an electromagnetic retarder as well as an electromagnetic retarder equipped with such a stator.

More particularly, the invention relates to a stator for electromagnetic retarders that are mounted directly on a gear case of a motor vehicle transmission, such as the axle or the gearbox housing of a motor vehicle.

Still more particularly, the invention relates to a stator for an electromagnetic retarder intended for mounting on the gearbox and/or axle of a vehicle, comprising at least one electromagnetic coil and one asymmetric pole shoe on each radial transverse end face of each electromagnetic coil attached by means of a central axial screw.

2. Prior Art

A vehicle electromagnetic retarder can be used to assist a conventional (service) brake comprising brake pads that come together and press against at least one wheel hub disc in order to brake the vehicle. With the presence of endurance braking systems such as the electromagnetic retarder in parallel with conventional brakes, particularly for heavy vehicles such as trucks, reducing vehicle speed is achieved more safely, especially in long descent situations where premature brake pad wear is inevitable. As a commonly used endurance braking system, the electromagnetic retarder thus makes it possible to limit replacements of worn parts and reduce the cost and time of vehicle maintenance.

Generally, an electromagnetic retarder comprises at least one stator and at least one rotor. If the stator is directly connected to a vehicle transmission gear case, such as a gearbox housing or a transmission axle housing, and does not intersect a drive shaft in the retarder assembly, it is referred to as a "Focal" retarder (registered trademark). Otherwise, that is to say, with electromagnetic retarders intended to be placed on a drive shaft between an axle and a gearbox, said drive shaft is divided into two parts or portions by at least one retarder, and is referred to as an "Axial" retarder (registered trademark).

An electromagnetic retarder of the Focal type, described for example in document FR 2 577 357, comprises an annular induction stator with a first front rotor and a second so-called rear rotor on either side. The annular induction stator is composed of a ring with an even number of coils, with axes parallel to that of the retarder, supported by a generally annular-shaped transverse flange, each coil having a cylindrical pole core made of magnetic material that passes through said flange and a winding of electrical wire surrounding said supporting pole core to form a magnetic pole, said core being fixed, in the direction of an axis of said core, perpendicular to a plane of the stator, and ending in flared ends partially covering the coil while retaining it.

The flared ends of the cores are generally composed of plates, called pole shoes, which have a symmetrical contour relative to a radial plane passing through the axis of the device and through the axis of the corresponding core, and which are mainly intended to extend and guide the magnetic effect of the coil.

The pole shoes perform several functions:

they maintain a certain distance between the coils and the armature so as to limit the axial magnetic forces of attraction exerted on the armature;

they ensure a good distribution of the magnetic flux in the armature, and thus an efficient generation of eddy currents;

they also play a mechanical role of retention and protection of the coils and/or of the pole cores.

In some cases, the shoe has a particular shape that extends it axially beyond the coil in order to optimize the passage of magnetic flux in order to increase the torques due to creation of eddy currents in the retarders in question.

FR 2 574 228 describes an asymmetric pole shoe, meaning the circumferential cross-section of each pole shoe is asymmetrical with respect to the radial plane passing through the axis of the retarder and through the axis of the corresponding core, in that a "leading horn" extends farther from said plane than a "trailing horn." The "leading horn" and the "trailing horn" of a pole shoe correspond, respectively, to the "upstream" or "front" edge and the "downstream" or "rear" edge of said shoe with respect to the relative travel direction of the continuous armature annular element, meaning that as it travels past each shoe, each point of said element moves from the "leading horn" to the "trailing horn" of said shoe.

Because the pole shoes face the armature disc, an area that is larger in front of than behind the radial plane passing through the pole axis makes it possible to achieve higher braking torque due to lower magnetic saturation on the rear side of the shoes, as compared to the conventional configuration where the shoes are arranged symmetrically with respect to the aforesaid radial plane.

An electromagnetic retarder of the Focal type having asymmetric pole shoes is described, for example, in document FR 2863787, and illustrated in prior art FIGS. 1A, 1B, 1C and 2A, 2B, 2C, attached to this description and presented below, in which an eddy current device comprises, in the center, a stator 1 comprising induction coils 2, and two armature rotors 3, one on each coaxial side of the stator, and rotatable relative to the stator around an axis of rotation X.

Each coil is traversed by a cylindrical pole core made of magnetic material, integral with an annular radial plate 4 and a thicker annular radial flange 5, whose peripheral edge is axially folded back to give it greater rigidity, arranged at the two opposite ends of the coils, these two ends each being equipped with a pole shoe 6 of a larger cross-section, attached with, for example, a central axial screw 7, on the outside of the core of each corresponding coil and on the annular radial plate 4 and the annular radial flange 5.

Each rotor (not shown) comprises at least one armature disc located opposite the corresponding pole shoes 6 with an interposed air gap (not shown), wherein, in relation to the direction (F) in which the armature disk travels past the pole shoes 6, each pole shoe faces the armature disc, with a larger area in front (leading horn E) than in the rear (training horn S) of the radial plane passing through the axis of rotation X and through the axis of the corresponding coil.

The two sets of asymmetric pole shoes, one respectively on each radial transverse end face of the set of coils, are oriented in the same direction relative to the direction of travel (F). In fact, by association with the two corresponding armature rotors, this makes it possible to achieve higher braking torques due to lower magnetic saturation on the rear side of the shoes compared to the conventional configuration where the shoes are arranged symmetrically relative to the aforesaid radial plane.

The stator 1, composed of a sandwich-type assembly (shoes 6—plate 4—coils 2—flange 5—shoes), is arranged such that it is also sandwiched between the two rotors (front and rear) along with air gaps. The stator 1 is supported by said generally annular-shaped transverse flange 5, equipped at its outer periphery with an axial stiffening edge 8, and mounted cantilevered on the housing in question with an openwork bell-shaped frame 9 by means of stator attachment lugs 10 integral with the stator flange 5, attached by screws to four arms 11 of the frame 9.

The frame is a rigid part that may be made, for example, of ductile cast type iron and has stator attachment arms 11 that match with the stator attachment lugs 10. These stator attachment lugs are traversed by the aforesaid screws, whose heads are supported on the outer face of the stator attachment lugs in order to attach the stator 1 to the arms 11 of the frame 9, which is itself already attached to the main body of the housing so as to achieve the direct mounting of the electromagnetic retarder, in a known manner, on the gear case of a motor vehicle transmission, and thus cantilevered at the exit from the gearbox 12 or axle housing 13 of said vehicle by its rotors (not shown).

The attachment of the Focal-type magnetic retarder stator with asymmetric shoes on two faces, oriented as explained above, has major drawbacks in practice. This type of configuration requires the use of either a stator specifically designed for a gearbox or a stator specifically for an axle, because the magnetic circuit is guided by the identically oriented asymmetric shoes on each face (left and right) of the stator, depending on the direction in which the armature rotor travels past the asymmetric pole shoes as described above. This requires a single installation direction for a stator having a guided magnetic circuit and means of support and attachment, for example, the support flange and the attachment lugs also capable of such shoe guidance. For each type of assembly, gearbox or axle, there is thus a different design; the two are not interchangeable.

In addition, the manufacture and marketing of these two types of specific retarders require complicated logistical management and thus additional investment.

A particular object of this invention is to overcome these drawbacks.

SUMMARY OF THE INVENTION

The present invention proposes a new design for Focal-type retarders having asymmetric pole shoes on two faces, a new design of a standardized stator that can thus be attached to either a gearbox or an axle of a vehicle without any modification of its structure, despite a magnetic circuit guided by oriented asymmetric shoes which always remain specific to the direction of travel of the rotor driven by the vehicle transmission.

To this end, according to the invention, an induction stator for an electromagnetic retarder for a vehicle, comprising:
 at least one electromagnetic coil assembly,
 at least one substantially radial and annular electromagnetic coil support,
 an asymmetric pole shoe on each radial transverse face of the two ends of each of said electromagnetic coils,
 is characterized by also comprising
 means for attaching said stator, which are symmetrical with respect to a median plane between and parallel to said transverse faces, and are attached to said electromagnetic coil support in order to attach said stator at one or the other of said transverse faces to a stator support of said vehicle, using fasteners.

In a preferred embodiment, the electromagnetic coil support comprises an annular radial flange on each of the opposite ends of said electromagnetic coil assembly, and the means for attaching the stator are perforated attachment studs that are symmetrical relative to said median plane, connecting said radial flanges to attach said electromagnetic retarder stator to a stator support of said vehicle by means of fasteners.

In another embodiment, the electromagnetic coil support comprises an annular radial plate and an annular radial flange at each of the two opposite ends of said electromagnetic coil assembly, and the means for attaching the stator are attachment holes made in the corners, symmetrically distributed along the outer periphery of the flange and arranged symmetrically according to the thickness of the stator; it is also possible to provide attachment lugs that are symmetrical relative to said median plane, integral with the stator flange, covering the attachment holes.

The fasteners may be screws, bolts, or other known conventional mechanical attachment means.

In addition, the invention also relates to a Focal-type electromagnetic retarder with asymmetric pole shoes on two faces, and comprising at least one stator as defined above.

Other features and advantages of the invention will become apparent from the following description of embodiments, given as non-limiting examples.

DESCRIPTION OF THE DRAWINGS

FIGS. 2A, 2B, and 2C are, respectively, views similar to FIGS. 1A, 1B and 1C of a prior art Focal-type electromagnetic retarder stator, but with FIG. 2A showing dedicated "axle" asymmetric shoes on two faces, FIG. 2B showing the mounting of the aforesaid retarder on the axle, and FIG. 2C showing a view from the axle, in the direction Z', of the prior art stator;

FIGS. 1A-C and 2A-C being already described above.

DESCRIPTION OF THE PREFERRED EMBODIMENT

With reference to the attached drawings, the invention is described below in its preferred but non-limiting application to Focal-type stator electromagnetic retarders with oriented asymmetric shoes on two faces.

Structurally or functionally identical components present in several different figures are always identified by the same numeric or alphanumeric reference.

Figure 1C:
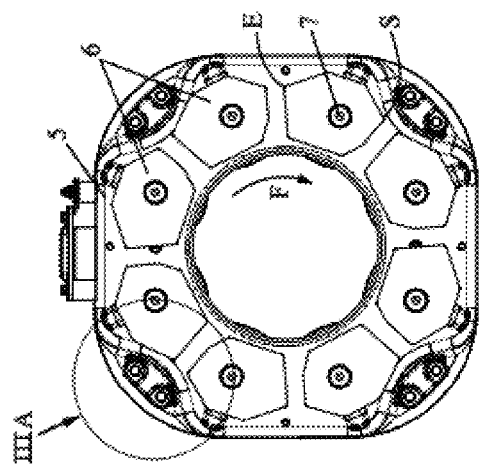
FIGS. 1A, 1B, and 1C are side views of a prior art Focal-type electromagnetic retarder stator, with FIG. 1A showing dedicated "gearbox" asymmetric shoes on two faces, FIG. 1B showing the mounting of the aforesaid retarder on the gearbox, and FIG. 1C showing a view from the gearbox, in the direction Z, of the prior art stator.
Figure 1B:
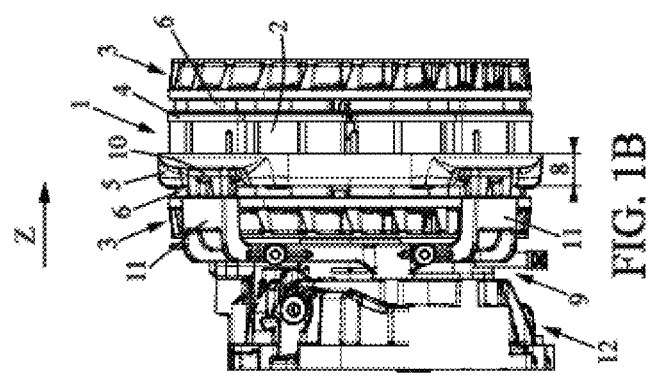
Figure 1A:
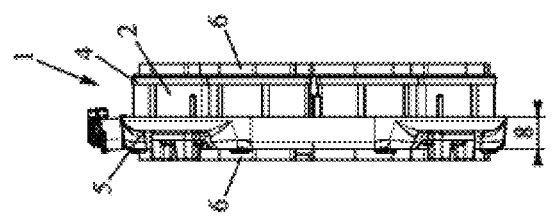
Figure 3A:
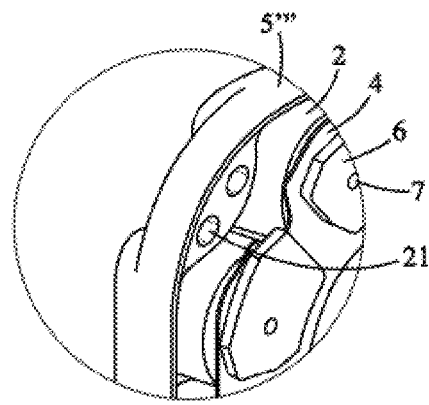
FIGS. 3A and 3B are partial schematic views of an axial cross-section along the plane P from FIG. 1C or 2C, of the stator attachment holes in FIG. 3A and of an extended attachment lug in FIG. 3B, according to the first embodiment of the invention.
Figure 3B:
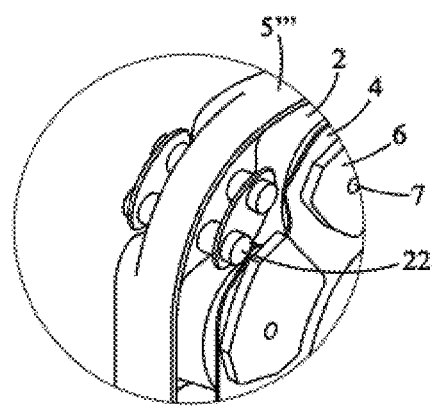

According to a first embodiment of the stator according to the invention, shown in FIGS. 3A-3B, the electromagnetic coil support comprises an annular radial plate 4 and an annular radial flange 5''' at each of the two opposite ends of the electromagnetic coil assembly 2, and the stator attachment means are attachment holes 21 made in the corners, symmetrically distributed along the outer periphery of the flange 5''' and arranged symmetrically according to the thickness of the stator; it is also possible to provide attachment lugs 22 that are symmetrical relative to the median plane, integral with the stator flange 5''', covering the attachment holes.

Figure 4C:
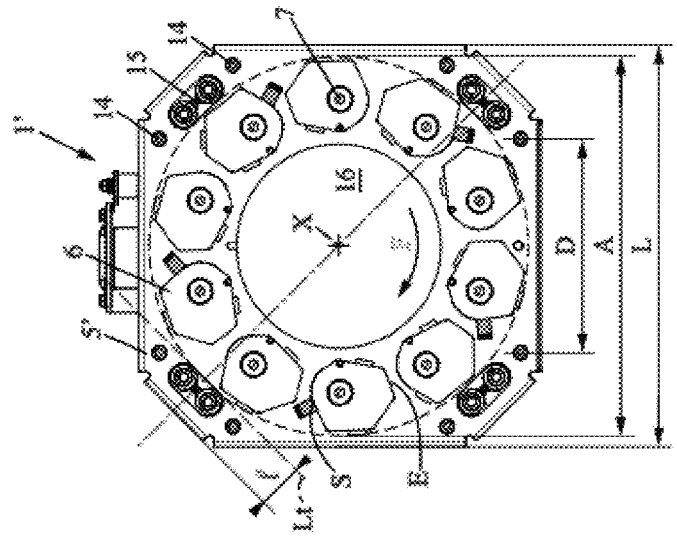
FIGS. 4A, 4B, and 4C are side views of a Focal-type electromagnetic retarder stator according to the present invention, with FIG. 4A showing dedicated "gearbox" asymmetric shoes on two faces, FIG. 4B showing the mounting of the aforesaid retarder on the gearbox, and FIG. 4C showing a view from the gearbox, in the direction Z, of the stator according to the preferred embodiment of the present invention.
Figure 4B:
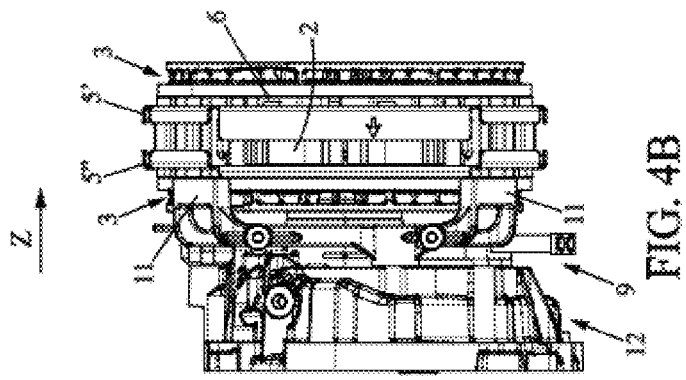
Figure 4A:
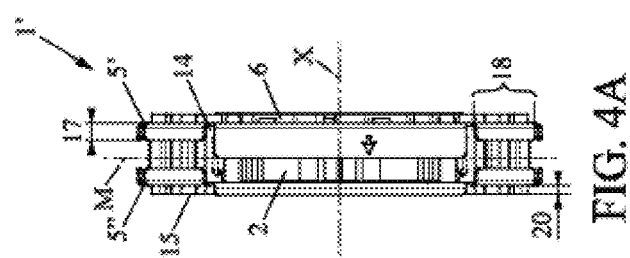
Figure 5A:
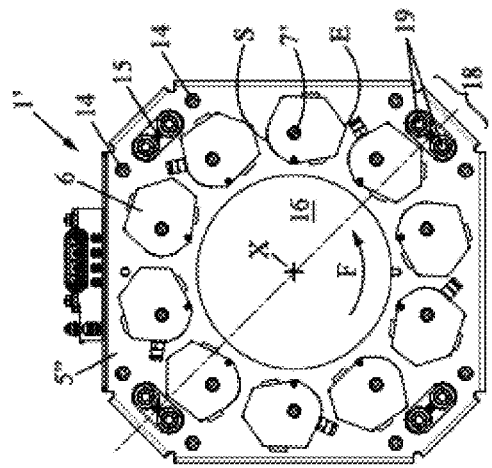
FIGS. 5A, 5B, and 5C are, respectively, views similar to FIGS. 4A, 4B, and 4C of a Focal-type electromagnetic retarder stator according to the preferred embodiment of the present invention, but with FIG. 5A showing dedicated "axle" asymmetric shoes on two faces, FIG. 5B showing the mounting of the aforesaid retarder on the axle, and FIG. 5C showing a view from the axle, in the direction Z', of the stator according to the preferred embodiment of the present invention.
Figure 5B:
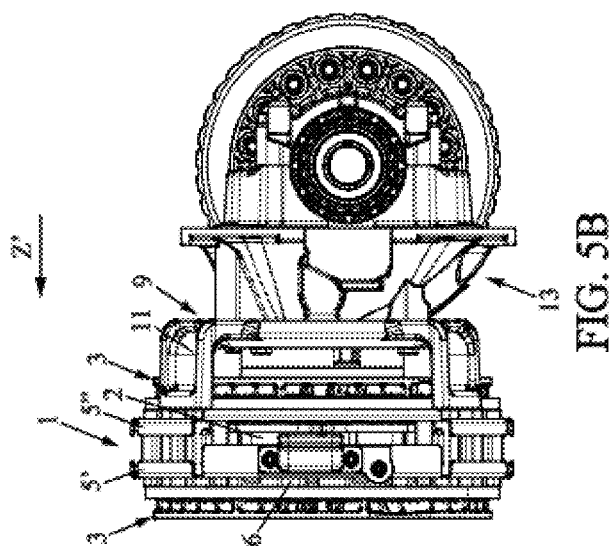
Figure 5C:
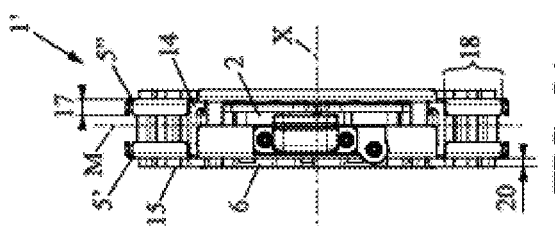

According to the novel design of a preferred embodiment of the stator according to the invention, shown in FIGS. 4A-C and 5A-C, the electromagnetic retarder stator 1' comprises coil assemblies 3 in an even number, for example ten, as illustrated in FIGS. 4C and 5C, distributed angularly in a regular manner around the axis X of the stator.

At its two opposite ends, a left flange 5' and a right flange 5'', nearly identical to one another, are connected together at least at the four symmetrical corners with conventional stator mounting means 14, for example spacers such as shims or tubes as illustrated in FIGS. 4A-C and 5A-C. The stator attachment means 15, which are symmetrical relative to the axis X and relative to the median plane M, are also arranged at the four symmetrical corners, also connecting the two stator support flanges 5' and 5''. The retarder rotor is not presented here to simplify the presentation.

More specifically, FIGS. 4C and 5C respectively illustrate a view from the gearbox in the direction Z and a view from the axle in the direction Z', of the stator according to a preferred embodiment of the invention, wherein the oriented asymmetric shoes 6 are intended for mounting on the gearbox housing (not shown), that is to say, each pole shoe faces the armature rotor disc (not shown) with a larger front area (leading horn E) than rear area (trailing horn S) relative to the radial plane passing through the axis of rotation X (also the axis of the stator) and through the axis of the corresponding coil. The opposite armature rotor disc (not shown) is driven by the respective leading or trailing shaft of the gearbox or the axle, and rotates in the same counterclockwise direction as the shaft (also the aforesaid direction of travel F).

Each shoe 6 arranged in front of the support flange 5' or 5'' on the same side of the stator, is attached by means of an axial screw 7 or 7' to the center of the core (not shown) of the corresponding coil. Axially, each shoe 6 is delimited by an outer end side face, and all outer side faces of the shoes located on that same side of the stator 1' are coplanar with each other and parallel to the stator support flanges 5' and 5''.

The flange of the stator support is supported by the housing by means of an openwork bell-shaped structure as previously presented.

These stator support flanges 5' and 5'' are themselves pierced at their center with a circular hole 16 of relatively large diameter D and, at its periphery, with smaller holes (not shown) corresponding to the number of the shoes 6, for example ten as illustrated in FIGS. 4A-C and 5A-C, and appropriate for receiving one coil core each. The cores are terminated with asymmetric pole shoes added on to their axial ends and in front of the flanges 5' and 5'' as presented below.

The diameter A of the outer circle C circumscribed at the outer ends of the vertical sides of all shoes is slightly smaller than the overall width L of the stator, said width being that of the flange, which is itself generally delimited along its periphery by a folded-back edge (17) for reinforcement and protection.

The flanges 5' and 5'' have a substantially annular shape, the entire periphery of said flanges and thus of their folded-back edge 17 generally having a shape that allows it to have a width 1 in the four corners regularly distributed around the axis X corresponding to the four arms of the frame (not shown), such that this width delimited by the folded-back edge 17 of the corner and a line Lt substantially tangential to the circle C of diameter A is sufficiently large to allow the arrangement of the stator mounting means 14 and the stator attachment means 15, which are symmetrical relative to the median plane M.

In the case of ten coils as illustrated in FIGS. 4C and 5C, the entire perimeter of said flange advantageously has the general shape of a square, with rounded or cut corners for ease of manufacture, as illustrated in FIGS. 4C and 5C, that is to say, replaced by four oblique sides 18 smaller than the four sides of the square, each of which is substantially parallel to the line Lt defined above in said corner. Other shapes for the entire periphery of the flange are defined as a function of the number of coils.

The stator attachment means 15 are arranged in said four corners, symmetrically to the extension of the diameter A passing through the angle of the square, which has already been rounded or cut, corresponding to the arms of the aforesaid frame, thus connecting the two stator support flanges 5' and 5'' arranged at the two opposite ends of said electromagnetic coil assembly.

These stator attachment means 15 may be perforated attachment studs that are symmetrical relative to the median plane M, as illustrated in FIGS. 4A-C and 5A-C, connecting the two support flanges 5' and 5'' to attach the stator to a stator support of the vehicle, such as the four aforesaid arms of the frame, by means of fasteners.

The bore 19 for each stud is smooth and made in such a way that a fastener (for example the shank of a screw) is able to pass through for its entire length, which is slightly larger than the thickness of the stator between the two flanges 5' and 5'', the projecting portion 20 relative to the surfaces of the flanges 5' and 5'' thus forming a housing for the shank of the fastener (screw).

Using such studs, which are substantially symmetrical from one side to the other and have a bore passing through the thickness of the stator, it is possible to attach the stator 1' by means of fasteners, on either side, as the components of the stator itself are also symmetrical from either side to the other, and allow mounting a stator 1' of the same design according to the invention, to the gearbox housing or to the axle housing of a vehicle.

A stator attachment means generally comprises two parallel studs, laterally connected into a single piece, to attach the stator 1' with fasteners to the arms of the aforesaid frame. The fastener may be at least one pin such as the one usually used to attach the stator to the arms of the aforesaid frame. Such pins are intended to pass through the entire length of the bore and their shank is sunk into a threaded attachment part of the arms of the aforesaid frame. As a variant, the fastener may be a screw, a bolt, a strap, or any other conventional means for that purpose. As an example, the dimensions of the studs are 100 mm thick, 120 mm wide, and 26 mm high.

Whatever the embodiment chosen, in the end, a Focal-type retarder is obtained whose stator is standardized; it is no longer necessary to distinguish between the two types of stators or the two types of electromagnetic retarders when mounting on a vehicle, as is the case with those previously known.

Management of the manufacture and sale of retarders is also simplified and optimized by a single standardized reference, consequently resulting in decreased investment and operating costs.

Naturally, the present invention is subject to many alternative variants. Although one or more embodiments have been described, it is understood that it is not practical to exhaustively identify all possible embodiments.

The invention claimed is:

1. An induction stator for an electromagnetic retarder, comprising:
   at least one electromagnetic coils assembly;
   at least one substantially annular electromagnetic coil support;
   an asymmetric pole shoe on each radial transverse face of the two ends of each of said electromagnetic coils; and
   means for attaching said stator, which are symmetrical with respect to a median plane between and parallel to said transverse faces, and are attached to said electromagnetic coil support in order to attach said stator at one or the other of said transverse faces to a stator support of said vehicle, using fasteners.

2. The induction stator for an electromagnetic retarder according to claim 1, wherein the stator support comprises a first annular radial flange and a second annular radial flange at the two opposite ends of said electromagnetic coil assembly.

3. The induction stator for an electromagnetic retarder according to claim 1, wherein the means for attaching said stator are perforated attachment studs, symmetrical relative to the median plane.

4. The induction stator for an electromagnetic retarder according to claim 1, wherein:
   the stator support is composed of an annular radial plate and an annular radial flange, each at one of the respective two opposite ends of said electromagnetic coil assembly,
   the means for attaching said stator being arranged on the flange.

5. The induction stator for an electromagnetic retarder according to claim 4, wherein the means for attaching said stator are attachment holes made in the corners, symmetrically distributed along the outer periphery of said flange and arranged symmetrically according to the thickness of the stator.

6. The induction stator for an electromagnetic retarder according to claim 5, wherein the means for attaching said stator further comprise attachment lugs, symmetrical relative to said median plane, integral with said stator flange, covering the attachment holes.

7. An electromagnetic retarder for an automotive vehicle, comprising at least one stator according to claim 1.

8. The induction stator for an electromagnetic retarder according to claim 2, wherein the means for attaching said stator are perforated attachment studs, symmetrical relative to the median plane.

9. The induction stator for an electromagnetic retarder according to claim 1, wherein each asymmetric pole shoe is arranged in front of a support flange on a same side of the stator.

10. The induction stator for an electromagnetic retarder according to claim 1, wherein each asymmetric pole shoe is delimited by an outer end side face, and all outer side faces of the asymmetric pole shoes located on a same side of the stator are coplanar with each other and parallel to the stator support.

11. An induction stator for an electromagnetic retarder, comprising:
    at least one electromagnetic coils assembly;
    at least one substantially annular electromagnetic coil support;
    an asymmetric pole shoe on each radial transverse face of the two ends of each of said electromagnetic coils; and
    a stator attachment device, which is symmetrical with respect to a median plane between and parallel to said transverse faces, and are attached to said electromagnetic coil support in order to attach said stator at one or the other of said transverse faces to a stator support of said vehicle, using fasteners.

12. The induction stator for an electromagnetic retarder according to claim 11, wherein the stator support comprises a first annular radial flange and a second annular radial flange at the two opposite ends of said electromagnetic coil assembly.

13. The induction stator for an electromagnetic retarder according to claim 11, wherein the stator attachment device comprises perforated attachment studs, symmetrical relative to the median plane.

14. The induction stator for an electromagnetic retarder according to claim 11, wherein:
    the stator support is composed of an annular radial plate and an annular radial flange, each at one of the respective two opposite ends of said electromagnetic coil assembly,
    the stator attachment device being arranged on the flange.

15. The induction stator for an electromagnetic retarder according to claim 14, wherein the stator attachment device comprises attachment holes made in the corners, symmetrically distributed along the outer periphery of said flange and arranged symmetrically according to the thickness of the stator.

16. The induction stator for an electromagnetic retarder according to claim 15, wherein stator attachment device further comprises attachment lugs, symmetrical relative to said median plane, integral with said stator flange, covering the attachment holes.

17. An electromagnetic retarder for an automotive vehicle, comprising at least one stator according to claim 11.

18. The induction stator for an electromagnetic retarder according to claim 12, wherein the stator attachment device comprises perforated attachment studs, symmetrical relative to the median plane.

19. The induction stator for an electromagnetic retarder according to claim 11, wherein each asymmetric pole shoe is arranged in front of a support flange on a same side of the stator.

20. The induction stator for an electromagnetic retarder according to claim 11, wherein each asymmetric pole shoe is delimited by an outer end side face, and all outer side faces of the asymmetric pole shoes located on a same side of the stator are coplanar with each other and parallel to the stator support.

* * * * *